July 13, 1926.
B. O. AUSTIN
1,592,325
MOTOR CONTROL SYSTEM
Filed Sept. 2, 1922    2 Sheets-Sheet 1
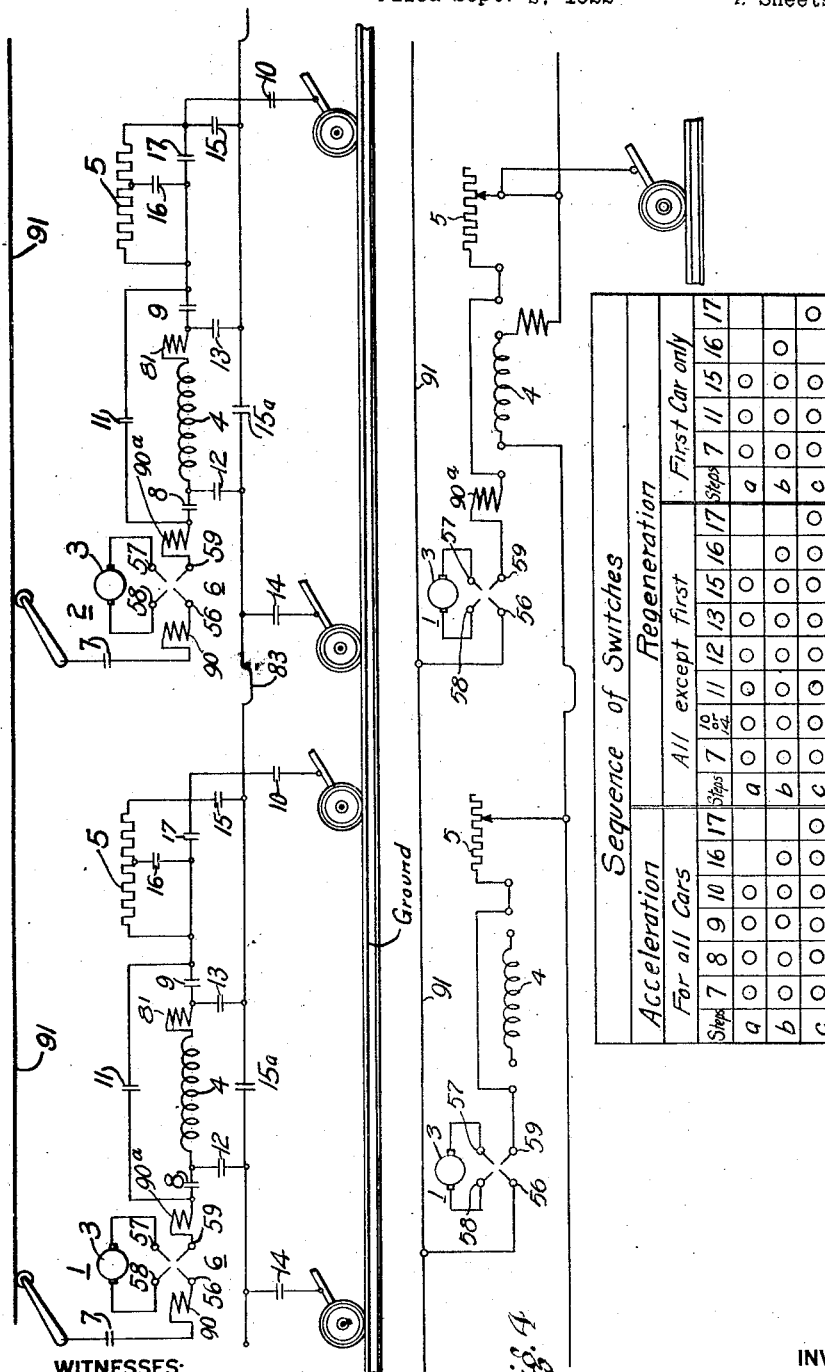
INVENTOR
Bascum O. Austin.
BY
ATTORNEY July 13, 1926.

B. O. AUSTIN

MOTOR CONTROL SYSTEM

Filed Sept. 2, 1922

WITNESSES:

INVENTOR
Bascum O. Austin.
BY
ATTORNEY

Patented July 13, 1926.

1,592,325

UNITED STATES PATENT OFFICE.

BASCUM O. AUSTIN, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed September 2, 1922. Serial No. 585,959.

My invention relates to motor control systems, and particularly, those systems for governing a plurality of motors mounted upon separate vehicles, constituting a multiple-unit train.

One object of my invention is to provide a system of control for a plurality of motor-driven vehicles that shall be capable of governing the motors during both acceleration and regeneration.

Another object of my invention is to have each of the vehicles provided with the same type of convertible control system, whereby it will be possible to connect the vehicles in any sequence and still secure desirable operating characteristics of the motors from either end of the train.

Still another object of my invention is to provide a method of governing a sequence drum or switching device, whereby desirable automatic accelerating characteristics of a plurality of motors may be secured.

Still another object of my invention is to provide a system for energizing the field-magnet windings of all motors to substantially the same value, thereby securing approximately equal braking torques during regeneration.

Another object of my invention is to employ the same current-limit relay to govern a plurality of motors during acceleration and regeneration.

A further object of my invention is to employ the main or starting resistors of one of the vehicles for controlling the energization of the field-magnet winding of each of the motors that are associated with the remaining vehicles.

Another object of my invention is to employ the same relay for overload protection during regeneration, as is employed during acceleration of the motors.

A further object of my invention is to provide a no-current relay on the leading vehicle to protect the motors against bus-line rupture.

Still another object of my invention is to provide a system of interlocking to prevent improper operation of the switches that govern the energization of the motors of the different vehicles during regeneration.

Heretofore, various systems of control have been employed to govern the motors of different vehicles that are connected together to constitute a train, but none of the systems in which the control equipment of all the cars was uniform was adapted to effect regenerative operation of the motors. Where regenerative operation of a plurality of motor-driven vehicles has been effected, it has been necessary to provide special or additional equipment for the first car in the train.

Briefly, my invention consists in employing substantially the same equipment for regenerative operation of a plurality of motor-driven vehicles constituting a multiple-unit train, that is employed during the acceleration of the vehicles. It comprises employing the starting resistors and accelerating contactors therefor on the first car of the train to govern the energization of the field-magnet windings of the motors that are mounted upon the other vehicles during regeneration.

For a better understanding of my invention, reference may be made to the accompanying drawings, wherein Figure 1 is a diagrammatic view of the main circuits of a control system for governing a plurality of motors that are mounted upon a plurality of vehicles;

Fig. 2 is a sequence chart indicating the order of closure of the main switches that are illustrated in Fig. 1.

Fig. 4 is a diagram showing the motors connected for regeneration.

Figure 3:
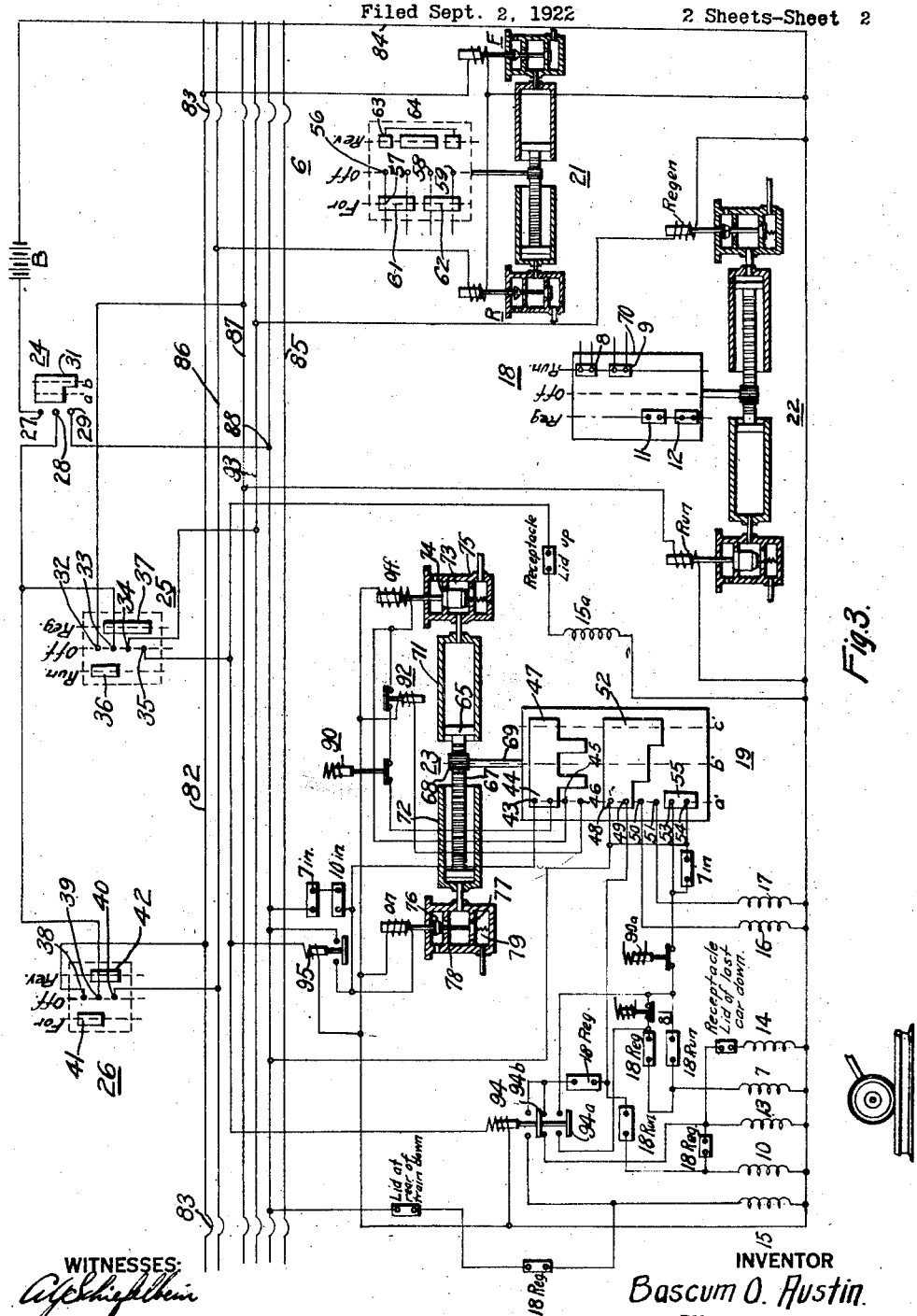
Fig. 3 is a diagrammatic view of the auxiliary control system that is employed to govern the switches of one of the cars illustrated in Fig. 1.

Referring particularly to Fig. 1 of the drawings, a plurality of motors 1 and 2 are each employed to drive an electrically operated vehicle. The numeral 1 is employed to designate the motor of the leading or first vehicle, while the main motors (only one illustrated) of all the remaining cars of the train are designated by the numeral 2. Each of the motors 1 and 2 is provided with an armature 3 and a series or main field-magnet winding 4. A main-circuit resistor 5 is mounted on each of the vehicles and is employed during acceleration of the motors 1 and 2 and also during regenerative operation. A reversing switch 6, having a central or "Off" position, a forward position *For.* and a reverse position *Rev.* is provided for each of the motors to change the relation of the armature 3 to the corresponding field-magnet winding 4.

A plurality of switches 16 and 17 are provided for shunting each of the resistors 5 during acceleration and regeneration of the motors 1 and 2. On each of the cars of the train, a plurality of switching devices or contact segments 8, 9, 11 and 12 are mounted upon a regenerative controller drum 18 and are governed thereby. A main or speed controller 19 is employed for governing a plurality of main switches 7, 10 and 13 to 15, inclusive, of the control system of each car.

The main reverser 6, regenerative controller 18 and speed controller 19 on each of the cars may be actuated by corresponding electro-pneumatic engines 21 to 23, inclusive. A master controller 24 and a master changeover switch or regenerative controller 25 are employed to govern the main speed controller 19 and the main changeover switch or regenerative drum 18, respectively. The main reverser 6 is governed by a master reverser 26 having a forward, an "Off" and a reverse position.

Each master controller 24 is provided with a plurality of control fingers 27, 28 and 29 that are adapted to be selectively engaged by contact segment 31. The master changeover switches 25, which are mounted upon each of the cars, are severally provided with a plurality of control fingers 32 to 35, inclusive, that are adapted to be engaged by contact segment 36 or contact segment 37.

Each of the master reversers 26 is provided with a plurality of control fingers 38 to 40, inclusive, that are adapted to be engaged by contact segment 41 or contact segment 42. Each of the main speed controllers 19 is provided with a plurality of control fingers 43 to 46, inclusive, that are adapted to be engaged by contact segment 47, a plurality of control fingers 48 to 51, inclusive, that are adapted to be engaged by contact segment 52 and a plurality of control fingers 53 and 54 that are adapted to be engaged by contact segment 55.

The main changeover switch 18 is provided with the switches 8 and 9, which are adapted to be closed when the controller is in the run position, and with the switches 11 and 12, which are adapted to be closed when the controller 18 occupies its regenerative position. The main reverser 6 is provided with a plurality of control fingers 56 to 59, inclusive, which are adapted to be engaged by a plurality of contact segments 61 and 62 when the main reverser occupies its forward position, and by a plurality of contact segments 63 and 64, when the main reverser 6 occupies its reverse position.

The pneumatic engine 23 comprises a plurality of pistons 65 and 66, which are mechanically connected by a rack member 67. The rack member is adapted to actuate a pinion 68, which is mechanically connected, by means of a shaft 69, to the main speed controller 19. Each of the pistons 65 and 66 is movably mounted in corresponding cylinders 71 and 72. An "Off"-valve mechanism comprises a movable valve member 73 that is adapted to normally close an outlet port 74 and to normally open an inlet part 75. When the actuating coil of the "Off" valve is energized, the inlet port 75 is closed and the outlet port 74 is opened.

The admission of fluid under pressure to the cylinder 72 is governed by an "On" valve mechanism comprising an outlet valve 76, which is normally open, and an inlet valve member 77, which is normally closed. These valves respectively govern the emission and admission of air through the corresponding outlet and inlet ports 78 and 79.

The pneumatic engine 22 is of similar construction to the engine 23, the coils marked "Run" and "Regen.", corresponding to the previously described "Off" and "On" coils, respectively. The electro-pneumatic engine 21 is of well-known standard construction for reversing switches, having forward and reversing valves F and R, respectively.

When the actuating coil of the reverse valve R is energized, the controller 6 is actuated to its reverse position, and, when the actuating coil of the forward valve F is energized, controller 6 is actuated to its forward position.

A current-limit relay 90 is employed on each of the cars to govern the movement of the main speed controller 19 in a manner hereinafter more fully described. The circuit connections of the actuating coils of the current-limit relays 90 for the motors 1 and 2 are illustrated in Fig. 1 of the drawings.

The operation of the train is effected by first actuating the master reverser 26 of the first car to either its forward or its reverse position in accordance with the direction of travel that is desired for the train. Upon the contact segment 41 bridging control fingers 38 and 39 of the master reverser 26, and the master controller 24 being actuated to its initial position *a*, a circuit is established from the positive terminal of the control battery B through control fingers 27 and 28, which are bridged by contact segment 31 of the master controller 24, control fingers 39 and 38, which are bridged by contact segment 41 of the master reverser 26, train-line conductor 82, which extends throughout the length of the train through the agency of a plurality of jumpers 83, the actuating coils of the forward valves of each of the electro-pneumatic engines 21 of the main reversers 6 and conductor 84 to the common train-line ground conductor 85 and thence to the negative terminal of the battery B.

If the master reverser 26 is actuated to its reverse position, a circuit is established through control fingers 39 and 40, which are bridged by contact segment 42 of the master reverser 26 and a common train-line conductor 86 that extends throughout the train to the actuating coil of each of the reverse valves R of the pneumatic engines 21, which are employed to actuate the main reverser 6.

The master changeover switch 25 is actuated to either its "run" or "regenerative" position prior to actuating the master controller 24 to its initial position $a$. If the main changeover switch is actuated to its "run" position, upon the master controller 24 being actuated to its initial position $a$, a circuit is established from the positive terminal of the battery B through control fingers 27 and 28, which are bridged by contact segment 34 of the main controller 24, control fingers 32 and 33, which are bridged by contact segment 36 of the master changeover switch 25, train-line conductor 87, which extends throughout the length of the train to the actuating coil of the "run" valve of the electro-pneumatic engines 22 of each of the main regenerative controllers 18. Upon the main regenerative controller 18 occupying its "run" position, switches 8 and 9 are closed.

When the master controller 24 is actuated to position $b$, a circuit is established from the positive terminal of the battery B, through control fingers 27 and 29, which are bridged by contact segment 31 of the master controller 24, train-line conductor 88, which extends throughout the length of the train to the "On" and "Off" valve of each of the pneumatic engines 23 that govern the main speed controllers 19 on each of the cars.

Each of the main speed controllers 19 normally occupies its initial position $a'$ because of fluid under pressure being applied to the piston 65 through the normally open inlet port 75 of the engine 23 while the cylinder 72 is in communication with the atmosphere through the outlet valve 78. In this position, of any one of the controllers 19, a circuit is established from the energized train-line conductor 88 through control fingers 48 and 49, which are bridged by contact segment 52 of the main speed controller 19, interlock 18-run and the actuating coil of the ground switch 10, and conductor 84 to the negatively energized train-line conductor 85. Corresponding circuits for closing the ground switches 10 are simultaneously established on all the cars of the train.

The line switches 7 on the cars are simultaneously closed upon their actuating coils being energized by corresponding circuits that are established from the positively energized train-line conductor 88 through control fingers 54 and 53, which are bridged by contact segment 55 of the main speed controller 19, the contact members of a current-limit relay 90a, interlock 18-run, actuating coil of the line switch 7 and conductor 84 to the negatively energized train-line conductor 85.

Upon the closure of the ground switch 10 and the line switch 7 on each of the cars, a corresponding circuit is established, as indicated in the sequence chart, Fig. 2, extending from a source of electrical energy, such for example, as a trolley conductor 91, through line switch 7, the coil of current-limit relay 90, control fingers 56 and 57, which are bridged by contact segment 61 of the main reverser 6, or the motor 2, in accordance with the car upon which the circuit is established, control fingers 58 and 59, which are bridged by contact segment 62 of the main reverser 6, actuating coil of the current relay 90a, contact members of the switch 8, series field-magnet winding 4 of the motor, actuating coil of the current relay 81, contact members of the switch 9, accelerating resistor 5 and ground switch 10 to the return circuit marked "Ground."

The motors 1 and 2 are accelerated by shunting their corresponding accelerating resistors 5 by the respective accelerating switches 16 and 17, the closure of which is effected in a manner hereinafter more fully described, and as indicated in the sequence chart.

The main speed controller 19 of each vehicle is actuated to positions $b'$ and $c'$ by means of fluid under pressure applied to the piston 66 through the "On" valve of the pneumatic engine 23 and the release of fluid under pressure from the piston 65 by the opening of the "Off" valve of the engine 23. The energization of the actuating coil of the "On" valve of the engine 23 is effected by a circuit that is established, upon the closure of the ground switch 10 and the line switch 7, from the positively energized train-line conductor 88 through interlocks 7-in and 10-in, actuating coil of the "On" valve of the engine 23, and conductor 84 to the negatively energized train-line conductor 85.

The actuating coil of the "Off" valve of the engine 23 is energized whenever a circuit is established from the positively energized train-line conductor 88 through interlocks 7-in and 10-in, control fingers 43 and 44, which are bridged by contact segment 47 of the main speed controller 19, contact members of the current-limit relay 90 and notching relay 92, the actuating coil of the "Off" valve of the engine 23, and conductor 84 to the negatively energized train-line conductor 85.

When the main speed controller 19 is actuated toward position $b'$, control finger 45 engages contact segment 47 thereof to insure the energization of the actuating coil of the "Off" valve of the engine 23 independently of the current relay 90 until the main speed controller 19 occupies position $b'$. In like manner, control finger 45 engages contact segment 47 in passing from position $b'$ to position $c'$ of the main speed controller to prevent the main speed controller from remaining in an intermediate position.

When the main speed controller 19 passes from one position to another, control finger 46 is engaged by contact segment 47 to also effect the energization of the actuating coil of the notching relay 92. When the notching relay 92 occupies its open position, the actuating coil of the "Off" valve of the engine 23 is not energized through control finger 44 of the main speed controller 19 until the control finger 46 no longer engages the contact segment 47.

If the current traversing the armature 3 of the main motor 1 is of an excessive value, the current-limit relay 90 will occupy its open position and thereby prevent further energization of the actuating coil of the "Off" valve of the engine 23, after the controller 19 has reached an operative position, until the current in the main circuit has fallen to a predetermined value.

It will be seen, therefore, that the above described arrangement of circuits for energizing the "Off" valve-actuating coil will prevent travel of the main speed controller 19 beyond a predetermined point under abnormal current conditions of the main motor 1.

When the main speed controller 19 occupies position $b'$ the actuating coil of the accelerating contactor 16 is energized by a circuit that is established from contact segment 52 of the main speed controller 19 through control finger 50, actuating coil of the accelerating contactor 16 and conductor 84 to the negatively energized conductor 85. One section of each starting resistor 5 is thus shunted. Upon the main speed controller 19 occupying position $c'$, control finger 51 engages contact segment 52 to effect the energization of the actuating coil of the accelerating contactor 17, to completely shunt the accelerating or starting resistor 5.

The successive operations of the main switches, 7, 10, 16 and 17 on each of the vehicles occurs substantially simultaneously to effect the acceleration of the motors 1 and 2.

When the train approaches a station at a high speed and it is desired to decelerate rapidly, the master controller 24 is actuated to the "Off" position to effect the de-energization of the actuating coils of the main switches 7, 10, 16 and 17 and permit them to assume their open position.

The master changeover switch 25 is then actuated to its regenerative position and the master controller 24 is again actuated to its initial position $a$, thereby establishing a circuit from the positive terminal of the battery B through control fingers 27 and 28, which are bridged by contact segment 31 of master controller 24, control fingers 33 and 34, which are bridged by contact segment 37, train-line conductor 93, which extends throughout the length of the train, the actuating coil of the regenerative valve R of the pneumatic engine 22 of each of the main regenerative controllers 18, and conductor 84 to the negatively energized train-line conductor 85.

Upon one of the regenerative controllers 18 being actuated to its regenerative position, corresponding switches 8 and 9 are opened and corresponding switches 11 and 12 are closed. Protective means is provided whereby the ground switch 10 and the line switch 7 on each car other than the first car of the train cannot be closed until the actuating coil of the current-limit relay 81 on each of the cars is energized. This protective means prevents a circuit from being established from the trolley conductor 91 through the armature of the motor 2 and accelerating resistor 5 to Ground on any one of the cars behind the first car until after the corresponding series field-magnet winding 4 of the motor 2 has been energized. On the first car of the train, a regenerative relay 94 is energized by a circuit that is established from the positively energized contact segment 37 of the master changeover switch 25, through control finger 35 thereof, actuating coil of the relay 94 and conductor 84 to the negatively energized train-line conductor 85.

When the relay 94 occupies its upper position, a circuit is established from the positively energized train-line conductor 88 through control fingers 54 and 53, which are bridged by contact segment 55 of the main speed controller 19, contact members of the current-limit relay 90a, contact members 94a of the relay 94, interlock 18-Reg., actuating coil of the line switch 7 and conductor 84 to the negatively energized train-line conductor 85. The switch 15 on the first car only is closed by a circuit that is established from the positively energized train-line conductor 88 through control fingers 48 and 49, which are bridged by contact segment 52 of the main speed controller 19, interlock 18-Reg., contact segment 94b of the relay 94, actuating coil of the switch 15 and conductor 84 to the negatively energized train-line conductor 85.

On each of the remaining cars in the train, the switch 13 is closed by a circuit that is established from the positively energized train-line conductor 88, through control fingers 48 and 49, which are bridged by contact segment 52 of the main speed controller 19, interlock 18-Reg., contact member 94b of the relay 94, which occupies its lower position, actuating coil of the contactor 13 and conductor 84 to the negatively energized train-line conductor 85.

A circuit is thus established, as indicated in the sequence chart, from the trolley conductor 91 through the line switch 7 of the first car, actuating coil of the current-limit relay 90, control fingers 56 and 57, which are bridged by contact segment 61 of the main reverser 6, armature 3, of the motor 1, contact segments 58 and 59, which are bridged by contact segment 62 of the main reverser 6, actuating coil of the current relay 90a, switch 11, accelerating resistor 5, switch 15, train-line jumper 83, switch 12 series field-magnet winding 4 of the motor 2, actuating coil of the current-limit relay 81, and switches 13, 15 and 10 to Ground.

The switch 14 that is mounted on the last car will be closed, if it is at the rear end of the car, by an interlocking device that is mechanically connected to a receptacle lid at the rear of the train. This interlocking device connects the actuating coil of the switch 14 of the last car across the actuating coil of the switch 13 of the same car.

If the switch 14 is at the end of the train, then the circuit of the rear car traverses switch 13, series field-magnet winding 4 of the motor 2, and switches 12 and 14 to Ground. The switch 15 on the car at the rear of the train may be closed by a circuit that is established from the positively energized train-line conductor 88 through an interlock lid-down, that is mechanically connected with the lid at the rear of the train, interlock 18-Reg., actuating coil of the switch 15 and conductor 84 to the negatively energized train-line conductor 85.

Upon the energization of the series field-magnet winding 4 of the motor 2, the corresponding current-limit relay 81 assumes its closed position, thereby effecting the energization of the line switch 7 by a circuit that is established from the train-line conductor 88, through control fingers 54 and 53, which are bridged by contact segment 55 of the main speed controller 19, the contact members of the current-limit relays 90ª and 81, interlock 18-Reg., actuating coil of the line switch 7 and conductor 84 to the negatively energized train-line conductor 85.

The switches 10 and 13 on all of the cars other than the first car are closed by a circuit that is established from the positively energized train-line conductor 88 through control fingers 48 and 49, which are bridged by contact segment 52 of the main speed controller 19, interlock 18-Reg., contact member 94b of the relay 94, which occupies its lower position, actuating coil of the contactor 13 and the actuating coil of the contactor 10, these actuating coils being connected in parallel relation by means of the interlock 18-Reg., to the conductor 84.

Upon the closure of the switches 7 and 10, on the second car, a circuit is established, as indicated in the sequence chart, from the trolley conductor 91, through line switch 7, actuating coil of the current-limit relay 90, control fingers 56 and 57, which are bridged by contact segment 61, of the main reverser 6, armature 3 of the motor 2, control fingers 58 and 59, which are bridged by contact segment 62 of the main reverser 6, actuating coil of the current-limit relay 90a, contact members of the switch 11, accelerating resistor 5 and the contact members of the switch 10 to Ground.

In this way, regenerative operation of all machines except those on the first car is effected, the resistors on the first car serving to adjust the excitation of the regenerating machines, which is derived from the trolley circuit.

The electrical braking effect is increased by the closure of accelerating contactors 16 and 17 on each of the cars other than the first car to shunt corresponding resistors 5. The closure of the accelerating contactors 16 and 17 on each of the cars, except the first car, is effected in the same manner during regeneration as during acceleration of the motors 1 and 2.

Briefly speaking, the interlocks 7-in and 10-in are closed when it is desired to establish circuits to the "On" and "Off" valves of each of the engines 23 that govern the main speed controllers 19. If the current traversing the coil of the current-limit relay 90 becomes too great, the engine 23 will cease to actuate the main speed controller 19 toward position $c'$, and if the current is above a predetermined value, the relay 90a will open to effect the opening of the line switch 7. The switch 7 will not assume its closed position again until the controller 19 again occupies position $a'$, as the contact segment 55 of the main controller 19 bridges control fingers 53 and 54, only when the controller 19 occupies its first position.

On the first car, the actuating coils of the "On" and "Off" valves of the engine 23 are energized independently of the interlocks 7-in and 10-in, by a circuit that is established from contact segment 37 of the master changeover switch 25, through control finger 35, actuating coil of the relay 95, and conductor 84 to the negatively energized train-line conductor 85. The closure of the relay 95 permits the energization of the actuating coils of the "On" and "Off" valves in the same manner as has been described for the acceleration of the motor 1.

As the speed of the train decreases, the accelerating contactors 16 and 17 on the first car will successively close to shunt the accelerating resistor 5.

If it should happen that the switch 14 on the first car is toward the rear of the train, then a main switch 15a is closed on the first car to establish a circuit from the switch 15 through the switch 15a to the jumper 83 between the first and second cars.

The closure of the switch 15a on the first car is effected by energizing its actuating coil by means of a circuit that is established through an interlock with the receptacle lid at the end of the first car corresponding to the switch 14. When this lid is up, a circuit is established from control finger 35 through the interlock lid-up, actuating coil of the contactor 15a and conductor 84 to negatively energized train-line conductor 85.

From the above description, it is apparent that I have provided a system of control that is uniform upon all the cars of a train whereby both acceleration and regeneration of the motors of a plurality of vehicles may be effected.

While I have illustrated and described the invention for a control system having only one motor for each car, it is evident that, in actual operation, a greater number of motors for each car would be employed. However, series-parallel control of a plurality of motors is well understood in the art and, for the sake of simplicity and clearness, only one motor has been illustrated for each car. While I have shown my invention in its preferred form, various modifications may be made in the illustrated arrangement of circuits and apparatus without departing from the spirit and scope of my invention. I desire, therefore, to be limited only by the scope of the appended claims.

I claim as my invention:

1. In a motor-control system, the combination with a plurality of vehicles, each being provided with a driving motor having an armature and a field-magnet winding, of a resistor mounted upon each of said vehicles, means for connecting a resistor mounted upon one of said vehicles in series relation with a winding of a motor mounted upon another of said vehicles, and means for connecting another winding of said motor in parallel relation to the first-named winding and said resistor.

2. In a motor-control system, the combination with a plurality of vehicles, each being provided with a driving motor having an armature and a field-magnet winding, of a source of electrical energy therefor, a starting resistor mounted upon one of said vehicles, means for connecting said resistor in series relation with the field winding of a motor upon another vehicle during regeneration and means for connecting the armature of said motor to said source.

3. In a motor control system, the combination with a plurality of vehicles, each being provided with a driving motor having an armature and a field-magnet winding, of a source of electrical energy therefor, a voltage-varying device mounted upon each of said vehicles, means for connecting the field winding of one motor mounted on one vehicle in series relation with one of said devices mounted upon another of said vehicles and means for connecting the armature corresponding to said one vehicle to said source.

4. In a motor control system, the combination with a plurality of vehicles, each being provided with a driving motor having an armature and a field-magnet winding, of a voltage-varying device mounted upon each of said vehicles, means for connecting the field winding of one of said motors in series relation with one of said devices mounted upon another vehicle, and means for connecting the armature of the same motor to another of said devices.

5. In a motor control system, the combination with a plurality of vehicles, each being provided with a driving motor having an armature and a field-magnet winding, of means mounted upon each vehicle for accelerating the corresponding driving motor, means for connecting the field-magnet winding of one of said motors with the accelerating means mounted upon another of said vehicles, and automatic means for connecting the armature of the same motor to said source upon the corresponding field-magnet winding being energized during regeneration.

6. In a motor-control system, the combination with a controller having a plurality of operative positions, of means comprising a coil for actuating said device, means comprising a relay device for energizing said coil, means for energizing said coil independent of said device during the period said controller occupies a position intermediate two operative positions, and means for rendering said first energizing means inoperative during a portion of the period said controller occupies a position intermediate said operative positions.

7. In a motor-control system, the combination with a controller having a plurality of operative positions, of means comprising a coil for actuating said controller, a relay for de-energizing said coil under predetermined electrical conditions, means for energizing said coil independently of said relay for preventing said controller from occupying an inoperative position, and means comprising a second relay for preventing the overtravel of said controller beyond an operative position.

8. In a motor-control system, in combination, a controller adapted to occupy a plurality of operative positions, means for actuating the controller, means sensitive to load conditions adapted to interrupt the action of said actuating means and means cooperative to prevent the controller from occupying a position intermediate two operative positions, said means for assuring a predetermined movement of the controller being disposed for energization independent of the controller-actuating means.

9. In a motor-control system, in combination, a controller adapted to occupy a plurality of operative positions, electrically-controlled means for actuating the controller, said actuating means being subject to operation upon the closure of one of a plurality of circuits, means cooperative with the controller to effect the make and break of one of the circuits and means sensitive to changes in the loading of the motors to break another of the circuits, thereby to govern the operation of the controller.

10. In a motor-control system, in combination, a controller adapted to occupy a plurality of operative positions, electrically-controlled means for actuating the controller, said actuating means being subject to operation upon the closure of one of a plurality of circuits, means cooperative with the controller to effect the make and break of one of the circuits and means sensitive to changes in the loading of the motors to break another of the circuits, thereby to govern the operation of the controller, said last-mentioned means being adapted to prevent the stopping of the controller intermediate two operative positions.

In testimony whereof, I have hereunto subscribed my name this 30th day of August, 1922.

BASCUM O. AUSTIN.